United States Patent
Sugawara et al.

(10) Patent No.: US 7,029,413 B2
(45) Date of Patent: Apr. 18, 2006

(54) NEUTRAL CONTROL FOR VEHICULAR AUTOMATIC TRANSMISSION

(75) Inventors: Akio Sugawara, Toyota (JP); Masaru Morise, Nukata-gun (JP); Hideki Miyata, Okazaki (JP); Yuji Yasuda, Nishikamo-gun (JP); Hiroaki Takeuchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 10/834,077

(22) Filed: Apr. 29, 2004

(65) Prior Publication Data

US 2004/0242359 A1    Dec. 2, 2004

(30) Foreign Application Priority Data

May 28, 2003   (JP) ............................. 2003-151479

(51) Int. Cl.
*F16H 31/00*    (2006.01)

(52) U.S. Cl. .................................................. 475/117
(58) Field of Classification Search ............... 475/117, 475/116

See application file for complete search history.

(56) References Cited

U.S. PATENT DOCUMENTS

| 5,957,808 A | 9/1999 | Iizuka |
| 5,997,433 A | 12/1999 | Domian et al. |
| 6,039,673 A | 3/2000 | Mikami et al. |
| 6,517,459 B1 * | 2/2003 | Saito ........................... 475/116 |

FOREIGN PATENT DOCUMENTS

| DE | 41 18 474 | 1/1992 |
| DE | 197 37 413 | 3/1998 |
| DE | 199 02 131 | 8/1999 |
| EP | 0 742 395 | 11/1996 |
| JP | 4-77828 | 12/1992 |
| JP | 9-112673 | 5/1997 |
| JP | 2000-220703 | 8/2000 |
| JP | 2002-266980 | 9/2002 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A friction apply device, from among each pair of friction apply devices that are applied to achieve a speed from first speed to fourth speed, that is to be placed in a slipping state is selected based on a heat load when a neutral control is executed. As a result, it is possible to continue to execute the neutral control without the durability of the friction apply device being impaired by the heat load, for example, thereby increasing a fuel efficiency effect and the like achieved by the neutral control.

10 Claims, 4 Drawing Sheets

| SHIFT LEVER POSITION | | C1 | C2 | B1 | B2 | B3 |
|---|---|---|---|---|---|---|
| R | | × | × | × | ○ | ○ |
| N | | × | × | × | × | × |
| D | 1st | ○ | × | × | ○ | × |
| | 2nd | ○ | × | ○ | × | × |
| | 3rd | ○ | × | × | × | ○ |
| | 4th | ○ | ○ | × | × | × |
| | 5th | × | ○ | × | × | ○ |
| | 6th | × | ○ | ○ | × | × |

NEUTRAL CONTROL FOR VEHICULAR AUTOMATIC TRANSMISSION

INCORPORATION BY REFERENCE

The disclosure of Japanese Patent Application No. 2003-151479 filed on May 28, 2003, including the specification, drawings and abstract is incorporated herein by reference in its entirety.

BACKGROUND OF THE INVENTION

1. Field of the Invention

The invention relates to a vehicular automatic transmission. More specifically, the invention relates to an improvement in a neutral control that interrupts the transmission of power when driving while an automatic transmission is in a running speed.

2. Description of the Related Art

A known neutral control apparatus for a vehicular automatic transmission includes (a) an automatic transmission in which a shift is achieved by the application of a predetermined engaging element, and (b) neutral control executing means for executing a neutral control that interrupts the transmission of power by either releasing the engaging element, or allowing it to slip, when a predetermined condition to execute the neutral control is fulfilled when driving while the automatic transmission is in a running speed. One example of such an apparatus is disclosed in JP(A) 4-77828. The disclosed apparatus executes a neutral control while the vehicle is stopped in order to both prevent the generation of creep torque and improve fuel efficiency by reducing the engine load. When the hydraulic fluid temperature is so high that the volumetric efficiency of the pump is reduced, however, the apparatus cancels the neutral control to facilitate responsiveness during torque restoration.

A friction apply device which generates application force by friction is typically used as the engaging element, and slip control (e.g., a state in which the clutch is partially applied) is frequently executed during neutral control in consideration of responsiveness and shift shock and the like during torque restoration. This kind of slip control, however, generates a heat load on the friction apply device. If great enough or sustained long enough, the heat load may impair the durability of the friction apply device. Although it is possible to improve the durability of the friction apply device by, for example, increasing the number of friction plates lined with friction material, increasing the heat-resistance of the friction material, or increasing the amount of hydraulic fluid supplied for cooling, implementing these measures would either make the apparatus complex or increase costs, neither of which is desirable. It is also possible that when the heat load becomes high, the neutral control may be temporarily cancelled in order to protect the friction apply device. This would negate the improvement in fuel efficiency improvement that the apparatus was designed to achieve.

SUMMARY OF THE INVENTION

In view of the foregoing problems, it is an object of this invention to improve the durability of a friction apply device while maintaining an improvement in fuel efficiency achieved by a neutral control.

To achieve this object, an automatic shifting system for a vehicle according to one aspect of the invention includes i) an automatic transmission which is provided with a plurality of engaging elements including a first engaging element and a second engaging element, and which achieves a first running speed by applying the first engaging element and the second engaging element; and ii) a controller that executes a neutral control that interrupts the transmission of power by placing at least one of the applied first and second engaging elements in a released or slipping state when the automatic transmission is in a predetermined operating state in the first running speed. The controller in this system is adapted to select, when the neutral control is executed, one of the first and second engaging elements based on a predetermined condition and place the selected first or second engaging element in the released or slipping state.

In this kind of automatic shift system, a plurality of engaging elements are applied to achieve a running speed. When the neutral control is executed, the controller can switch the engaging element to be released or made to slip from one of the engaging elements to another of the engaging elements. As a result, it is possible to continue to execute the neutral control without the durability of the friction apply device being impaired by heat load, for example, thereby increasing the fuel efficiency effect and the like achieved by the neutral control.

Further, in the automatic shifting system, the first and second engaging elements may be friction apply devices that apply by friction. Also, the controller may be adapted to determine a heat load for each of the first and second engaging elements, and reference the determined heat loads as the predetermined condition when selecting the engaging element.

The controller in the automatic shifting system may also be adapted to prohibit the execution of the neutral control when the determined heat load of the first engaging element exceeds a predetermined first level and the determined heat load of the second engaging element exceeds a predetermined second level.

Accordingly, prohibiting the neutral control when both of the heat loads of the plurality of friction apply devices are high makes it possible to prevent the durability of the friction apply device from being impaired by the heat load generated during the neutral control.

Also in the automatic shifting system, the first running speed may be a forward speed; the automatic transmission may be adapted to selectively achieve a plurality of forward speeds including the first running speed by selectively applying or releasing the plurality of engaging elements; and the controller may be adapted to execute the neutral control even when the automatic transmission is in a second running speed which is a forward speed that has a gear ratio which is higher than the gear ratio of the first running speed.

According to this structure, the neutral control can be executed not only in the first speed, which has the largest gear ratio, but also in forwards speeds of a second speed, which has the second largest gear ratio, and higher, even when the vehicle is running. As a result, it is possible to achieve an even greater fuel efficiency effect and the like by the neutral control than can be achieved when neutral control is only executed while the vehicle is stopped or in the first speed.

The automatic shifting system may also include a vehicle speed sensor that detects the vehicle speed, and the controller may be adapted to prohibit the execution of the neutral control when the vehicle speed detected by the vehicle speed sensor exceeds a predetermined value.

The plurality of engaging elements used to achieve a running speed, i.e., the engaging elements able to be used with the neutral control, are at least two in number and are able to interrupt the transmission of power when at least one is released or slipping. When three or more engaging elements are used to achieve a predetermined running speed, the transmission of power may be interrupted by releasing or placing in a slip-state just one of the engaging elements, or two of the engaging elements simultaneously. The invention can be applied as long as there are at least two combinations possible for interrupting the transmission of power.

Hydraulic friction apply devices such as clutches and brakes that are frictionally applied by a hydraulic actuator, for example, are preferably used as the plurality of engaging elements to achieve the running speed. It is also possible, however, to use another kind of engaging element such as an electromagnetic clutch or a geared clutch or the like. Neutral control by slipping can also be executed on an engaging element such as a friction apply device in which the application torque can be controlled. The plurality of engaging elements here are input clutches or the like which transmit power from a source of driving force such as an engine, but they are not limited to this; they may also include reaction force brakes that cancel a reaction force, or the like.

The neutral control that interrupts the transmission of power essentially serves to increase energy efficiency, such as fuel efficiency, by reducing the load on the source of driving force such as the engine. Accordingly, it is desirable that the engaging element be completely released, but the transmission of some power as the engaging element slips is permissible. Execution of the neutral control when the vehicle is stopped also inhibits the generation of creep torque.

The controller is adapted to fundamentally select a predetermined one, for example, from among the plurality of engaging elements, to be used in the neutral control. If the selected engaging element is unusable for some reason, e.g., if its heat load is high, or if its use is inappropriate, the controller selects another engaging element to be used. It is also possible, however, to mechanically switch between engaging elements alternately or sequentially every predetermined number executions, or at predetermined intervals of execution, of the neutral control, for example. When the neutral control is executed in a plurality of forward speeds, selecting a common engaging element that is to be applied throughout the plurality of forward speeds enables continued execution of the neutral control while downshifting when, for example, the vehicle speed drops as a result of the accelerator being off, by releasing or applying other engaging elements.

The engaging element is selected based on the heat load, but if the selected engaging element is unusable due to the fact that its heat load is high, or if its use is inappropriate, another engaging element may be used instead. The heat load can be determined by detecting the temperature in the proximity of the surface of each friction apply device and determining whether the detected temperature is equal to, or greater than, a predetermined temperature. Alternatively, however, the heat load can be determined indirectly according to such factors as slip duration, or the length of time for which the friction apply device is continually made to slip in the neutral control, a slip rotation speed, input torque, the frequency with which the neutral control is executed, and the history and frequency of application and release (shifting) of the friction apply device on which the slip control is to be performed.

The neutral control in forward speeds of the second speed or higher, or while the vehicle is running, is preferably executed when the shift is a clutch-to-clutch shift and application torque (hydraulic pressure) of the friction apply device is controlled directly by a linear solenoid valve or the like. The invention can also be implemented with further variations and modifications, such as executing the neutral control only in the first speed, only while the vehicle is stopped, or when the transmission is in reverse.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE PREFERRED EMBODIMENTS

Figures 1A, 1B:
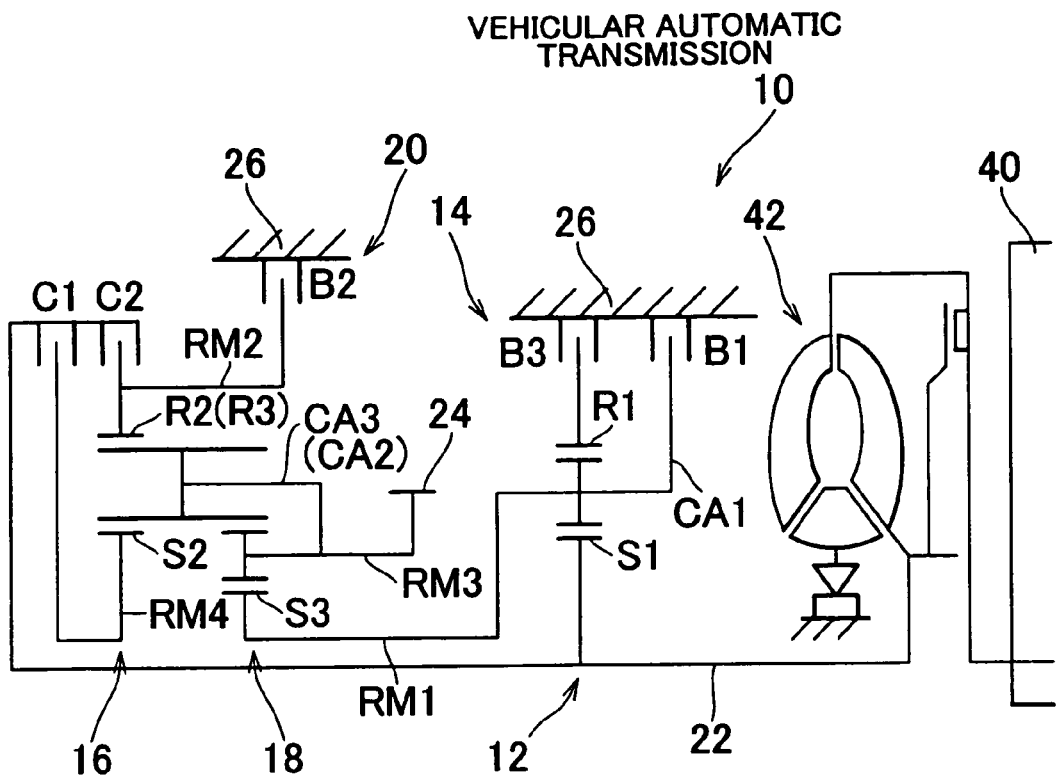
FIG. 1A is a skeleton view of a vehicular automatic transmission to which the invention can be applied.
FIG. 1B is a clutch and brake application chart showing various application and release combinations of clutches and brakes to achieve specific speeds in the automatic transmission shown in FIG. 1A.

In the following description and the accompanying drawings, the present invention will be described in more detail in terms of exemplary embodiments. FIG. 1A is a skeleton view of a vehicular automatic transmission 10 to which the invention can be applied, and FIG. 1B is a clutch and brake application chart showing various application and release combinations of clutches and brakes to achieve specific speeds in the automatic transmission 10 shown in FIG 1A. The automatic transmission 10 is a transverse-mounted transmission for use in, for example, a FF (front engine, front drive) vehicle. This automatic transmission 10 includes a first transmitting portion 14 and a second transmitting portion 20 aligned on the same axis. The main component of the first transmitting portion 14 is a single pinion type first planetary gear set 12. The main components of the second transmitting portion 20 are a single pinion type second planetary gear set 16 and a double pinion type third planetary gear set 18. The automatic transmission 10 changes the rate and/or direction of rotation of an output gear 24 with respect to the rate and/or direction of rotation of an input shaft 22 as appropriate. The input shaft corresponds to an input member, which is a turbine shaft of a torque converter 42 driven by an engine 40 that serves as a source of driving force for the vehicle. The output gear 24 corresponds to an output member and drives left and right drive shafts via a differential gear unit, not shown. The automatic transmission 10 is substantially symmetrical with respect to the center line (i.e., the axis), and thus the half of the automatic transmission 10 below the center line is omitted in FIG. 1A.

The first planetary gear set 12, which constitutes the first transmitting portion 14, includes three rotating elements: a sun gear S1, a planetary carrier CA1, and a ring gear R1. By coupling the sun gear S1 to the input shaft 22 so that it rotates together with the input shaft 22 as the input and fixing the ring gear R1 to a case 26 by a third brake B3 so that it cannot rotate, the planetary carrier CA1 serves as an intermediate output member, rotating slower than the input shaft 22. Also, the second planetary gear set 16 and the third planetary gear set 18 which together constitute the second transmitting portion 20, are coupled together at four portions which serve as four rotating elements RM1 to RM4. More specifically, a sun gear S3 of the third planetary gear set 18 serves as the first rotating element RM1; a ring gear R2 of the second planetary gear set 16 and a ring gear R3 of the third planetary gear set 18 are coupled together and serve as the second rotating element RM2; a carrier CA2 of the second planetary gear set 16 and a carrier CA3 of the third planetary gear set 18 are coupled together and serve as the third rotating element RM3; and a sun gear S2 of the second planetary gear set 16 serves as the fourth rotating element RM4. The second planetary gear set 16 and the third planetary gear set 18 are combined together so as to form a Ravigneaux type planetary gear train in which the carriers CA2 and CA3, as well as the ring gears R2 and R3, are shared as common members and the pinion gear of the second planetary gear set 16 also serves as the second pinion gear of the third planetary gear set 18.

The first rotating element RM1 (i.e., the sun gear S3) can be selectively prevented from rotating by coupling it to the case 26 by a first brake B1. The second rotating element RM2 (i.e., the ring gears R2 and R3) can be either selectively coupled to the input shaft 22 by a first clutch C1 or selectively prevented from rotating by coupling it to the case 26 with a second brake B2. The fourth rotating element RM4 (i.e., the sun gear S2) can be selectively coupled to the input shaft 22 via a second clutch C2. The first rotating element RM1 (i.e., the sun gear S2) is integrally connected to the ring gear R1 of the first planetary gear set 12, which serves as the intermediate output member. The third rotating element RM3 (i.e., the carriers CA2 and CA3) is integrally connected to the output gear 24 and outputs rotation thereto. The first brake B1, second brake B2, third brake B3, first clutch C1, and second clutch C2 are all multiple-disc hydraulic friction apply devices that can be frictionally applied using hydraulic cylinders. These hydraulic friction apply devices can be switched between applied and released states by energizing or de-energizing solenoid valves Sol1, Sol2, Sol3, Sol4, and Sol5, linear solenoid valves SL1 and SL2, and the like provided in a hydraulic pressure control circuit 98 shown in FIG. 3, or by switching a hydraulic pressure circuit using a manual valve, not shown.

Figure 2:
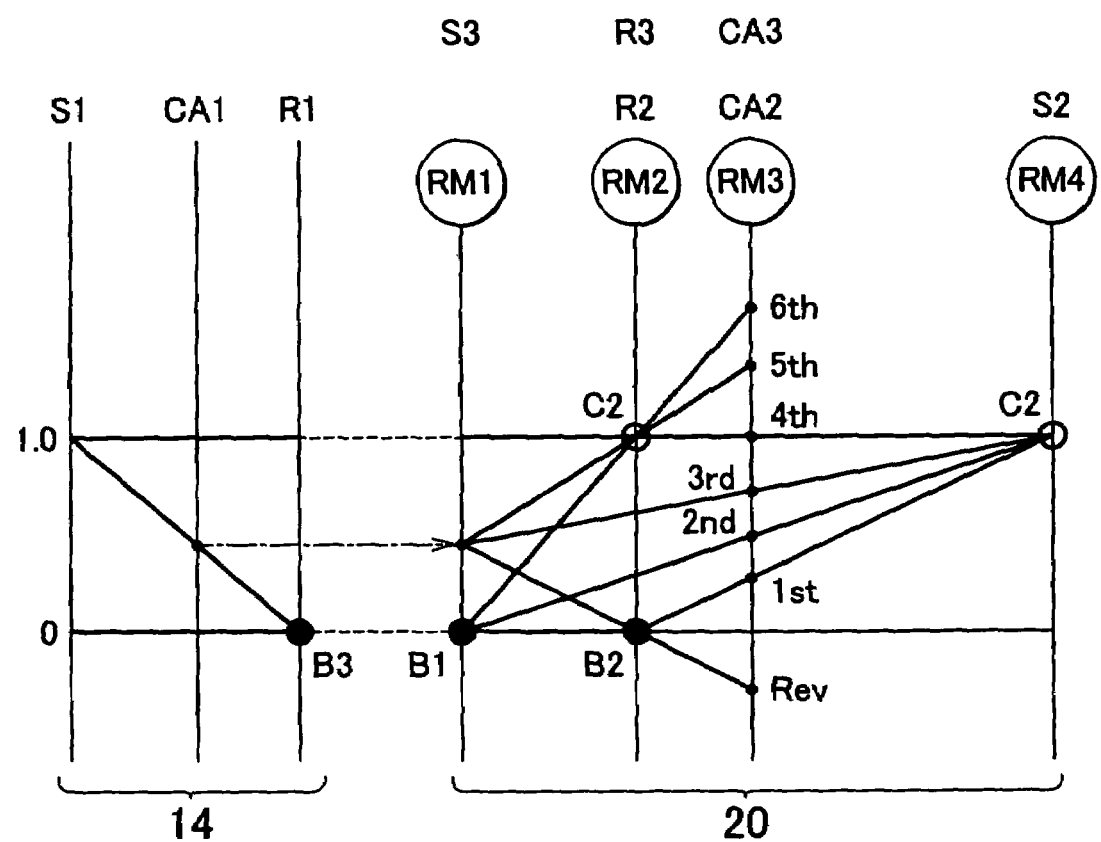
FIG. 2 is an alignment graph of the automatic transmission shown in FIG. 1A.

FIG. 2 is an alignment graph illustrating, using straight lines, the rotational speed of each of the rotating elements of the first transmitting portion 14 and the second transmitting portion 20. The lower horizontal line in the drawing denotes a rotational speed of "0" and the upper horizontal line in the drawing denotes a rotational speed of "1.0", i.e., a rotational speed the same as that of the input shaft 22. Further, the vertical lines corresponding to the first transmitting portion 14 denote, in order from left to right, the sun gear S1, the ring gear R1, and the carrier CA1, with the intervals between those lines set according to a gear ratio (=the number of teeth on the sun gear/the number of teeth on the ring gear) ρ1 of the first planetary gear set 12. Similarly, the four vertical lines corresponding to the second transmitting portion 20 denote, in order from left to right, the first rotating element RM1 (i.e., the sun gear S3), the second rotating element RM2 (i.e., the ring gears R2 and R3), the third rotating element RM3 (i.e., the carriers CA2 and CA3), and the fourth rotating element RM4 (i.e., the sun gear S2), with the intervals therebetween set according to a gear ratio ρ2 of the second planetary gear set 16 and a gear ratio ρ3 of the third planetary gear set 18.

As is evident from the alignment graph, when the first clutch C1 and the second brake B2 are applied, such that the fourth rotating element RM4 rotates integrally with the input shaft 22 and the second rotating element RM2 is kept from rotating, the third rotating element RM3 coupled to the output gear 24 rotates at a rotational speed denoted by "1st" and a first speed "1st", which has the largest gear ratio, is achieved. When the first clutch C1 and the first brake B1 are applied, such that the fourth rotating element RM4 rotates integrally with the input shaft 22 and the first rotating element RM1 is kept from rotating, the third rotating element RM3 rotates at a rotational speed denoted by "2nd" and a second speed "2nd", which has a gear ratio smaller than that of the first speed "1st", is achieved. When the first clutch C1 and the third brake B3 are applied, such that the fourth rotating element RM4 rotates integrally with the input shaft 22 and the first rotating element RM1 rotates via the first transmitting portion 14 at a slower speed than the input shaft 22, the third rotating element RM3 rotates at a rotational speed denoted by "3rd" and a third speed "3rd", which has a gear ratio smaller than that of the second speed "2nd", is achieved. When the first clutch C1 and the second clutch C2 are applied, such that the second transmitting portion 20 rotates integrally with the input shaft 22, the third rotating element RM3 rotates at a rotational speed denoted by "4th", i.e., the third rotating element RM3 is rotated at the same speed as the input shaft 22, and a fourth speed "4th", which has a gear ratio smaller than that of the third speed "3rd", is achieved. This fourth speed "4th" has a gear ratio of 1:1. When the second clutch C2 and the third brake B3 are applied, such that the second rotating element RM2 rotates integrally with the input shaft 22 and the first rotating element RM1 rotates via the first transmitting portion 14 at a slower speed than the input shaft 22, the third rotating element RM3 rotates at a rotational speed denoted by "5th" and a fifth speed "5th", which has a gear ratio smaller than that of the fourth speed "4th", is achieved. When the second clutch C2 and the first brake B1 are applied, such that the second rotating element RM2 rotates integrally with the input shaft 22 and the first rotating element RM1 is kept from rotating, the third rotating element RM3 rotates at a rotational speed denoted by "6th" and a sixth speed "6th", which has a gear ratio smaller than that of the fifth speed "5th", is achieved. Further, when the second brake B2 and the third brake B3 are applied, such that the second rotating element RM2 is kept from rotating and the first rotating element RM1 rotates via the first transmitting portion 14 at a slower speed than the input shaft 22, the third rotating element RM3 rotates in reverse at rotational speed denoted by "Rev" and a reverse speed "Rev" is achieved.

The table in FIG. 1B shows the relationships between each of the speeds and the operating states of the first clutch C1, the second clutch C2, the first brake B1, the second brake B2, and the third brake B3. The single circle indicates application and the "X" indicates release. In this exemplary embodiment, a clutch-to-clutch shift, in which one friction apply device is released at substantially the same time that another friction apply device is applied, is performed when shifting among all of the forward speeds. Also, each of the forward speeds from first speed "1st" to sixth speed "6th" are running speeds and are established by applying any two predetermined clutches or brakes from among the two clutches C and three brakes B. When any one of the two friction apply devices is released or allowed to slip, the transmission of power is interrupted and the automatic transmission 10 is placed in a neutral state. In this exemplary embodiment, the clutches C and brakes B, which are the friction apply devices, correspond to the plurality of engaging elements. The gear ratio for each speed is set appropriately according to the gear ratio ρ1 of the first planetary gear set 12, the gear ratio ρ2 of the second planetary gear set 16, and the gear ratio ρ3 of the third planetary gear set 18.

Figure 3:
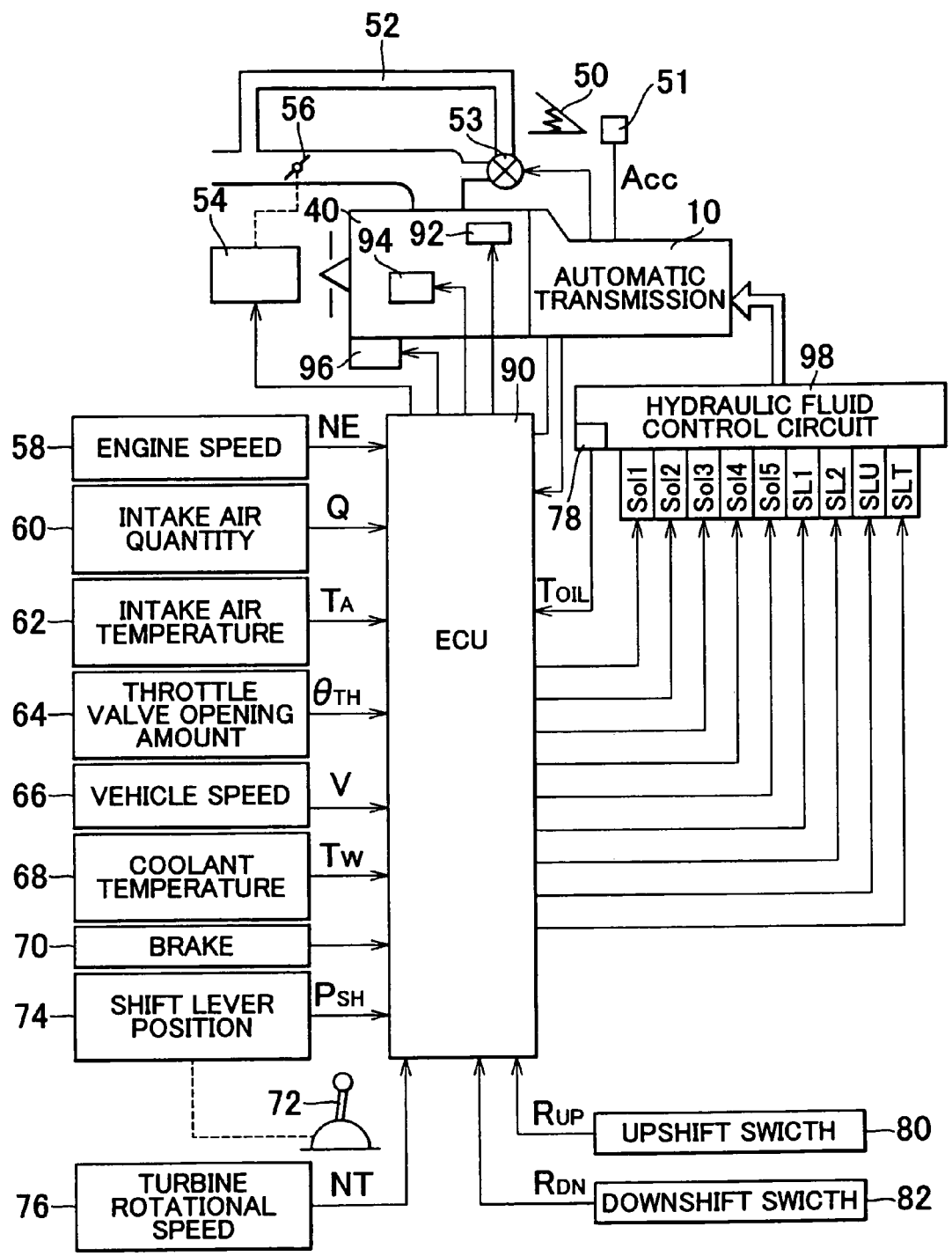
FIG. 3 is a is a block diagram showing the major parts of a control system provided in the automatic transmission shown in FIG. 1A.

FIG. 3 is a block diagram for illustrating the control system provided in the vehicle for controlling the transmission 10, the engine 40, and the like shown in FIG 1A. As is evident from the drawing, an operation amount $A_{cc}$ of an accelerator pedal 50 that is depressed by a driver is detected by an accelerator operation amount sensor 51. The accelerator pedal 50, which is depressed to a degree in accordance with an output amount required by the driver, corresponds to an accelerator operating member and the operation amount $A_{CC}$ corresponds to the required output amount. Also, an electronic throttle valve 56 which is operated by a throttle actuator 54 to have an opening angle (opening amount) $\theta_{TH}$ in accordance with the accelerator pedal operation amount $A_{cc}$ is provided an intake pipe of the engine 40. Further, an ISC valve (idle speed control valve) 53 is provided in a bypass passage 52, which bypasses the electronic throttle valve 56, to control the idle speed in the bypass passage 52. This ISC valve 53 controls the intake air quantity when the electronic throttle valve 56 is fully closed in order to control an idle speed $NE_{IDL}$ of the engine 40. In addition, various other sensors and switches are provided which include an engine speed sensor 58 for detecting an engine speed $N_E$ of the engine 40, an intake air quantity sensor 60 for detecting an intake air quantity Q of the engine 40, an intake air temperature sensor 62 for detecting a temperature $T_A$ of the intake air, a throttle sensor 64 with an idle switch for detecting both when the electronic throttle valve 56 is fully closed (i.e., an idle state) as well as the opening amount $\theta_{TH}$ of the electronic throttle valve 56, a vehicle speed sensor 66 for detecting a vehicle speed V (which corresponds to a rotation speed $N_{OUT}$ of the output gear 24), a coolant temperature sensor 68 for detecting a coolant temperature $T_W$ in the engine 40, a brake switch 70 for detecting operation of a foot brake, which is the main brake, a shift lever position sensor 74 for detecting a position (operating position) $P_{SH}$ of a shift lever 72, a turbine speed sensor 76 for detecting a turbine speed $N_T$ (=a rotation speed $N_{IN}$ of the input shaft 22), an AT fluid temperature sensor 78 for detecting an AT fluid temperature $T_{OIL}$ which is the temperature of the hydraulic fluid within a hydraulic pressure control circuit 98, an upshift switch 80, and a downshift switch 82. Signals from these sensors and switches indicative of the engine speed $N_E$, intake air quantity Q, intake air temperature $T_A$, throttle valve opening amount $\theta_{TH}$, vehicle speed V, engine coolant temperature $T_W$, a brake operation, shift lever position $P_{SH}$, turbine speed $N_T$, AT fluid temperature $T_{OIL}$, a shift range up command $R_{UP}$, a shift range down command $R_{DN}$, and the like are all supplied to an electronic control unit (ECU) 90.

The shift lever 72 is arranged near the driver's seat and can be selectively shifted into, for example, four positions such as "R" (reverse) to move the vehicle in reverse, "N" (neutral) to interrupt the transmission of power, "D" (drive) to move the vehicle forward by automatic shifting, and "S" (sequential) which is a forward running position that allows for manual shifting by switching among a plurality of shift ranges each having a different speeds on the high speed side into which shifting is possible. The shift lever position sensor 74 detects the position of the shift lever 72. When the shift lever 72 is in the "D" position, shifting is performed automatically using all of the speeds from first speed "1st" to sixth speed "6th" according to a predetermined shift map (shifting conditions) with values indicative of the running state, such as the vehicle speed V and the throttle valve opening amount $\theta_{TH}$, set as the parameters. When the shift lever 72 is in the "S" position, a plurality of shift ranges each having a different highest speed, i.e., in which the high speed side shift range with a small gear ratio is different for each range, is electrically established in response to an upshift command $R_{UP}$ or downshift command $R_{DN}$ from the upshift switch 80 or downshift switch 82.

The ECU 90 includes a so-called microcomputer that has a CPU, RAM, ROM, an input/output interface and the like. The CPU controls the output of the engine 10 and the shifting of the automatic transmission 14 and the like by processing signals according to a program stored in the ROM beforehand while using the temporary storage function of the RAM. When necessary, the CPU may be configured such that the portion used for engine control is separate from the portion used for shift control.

Figure 4:
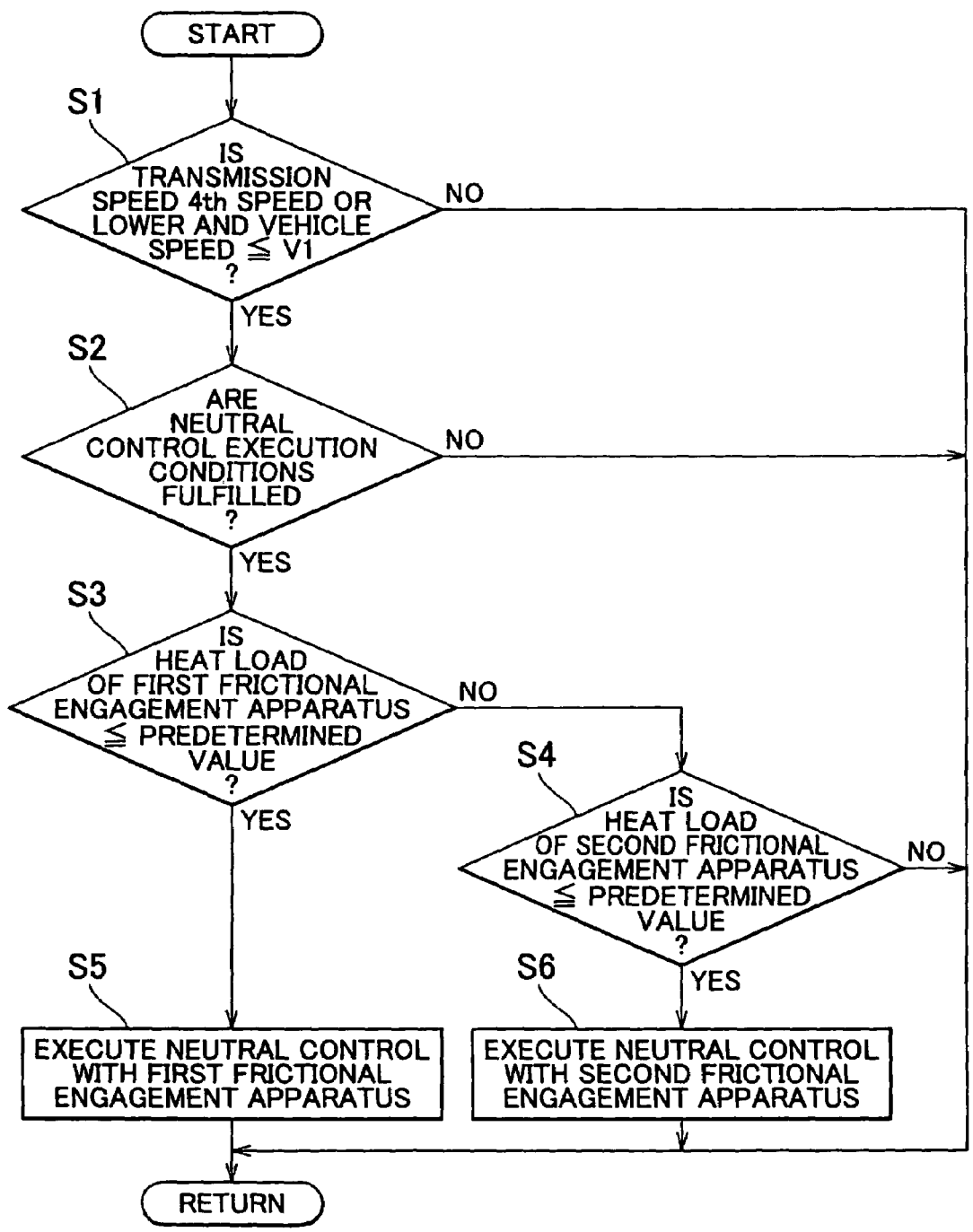
FIG. 4 is a flowchart detailing functions of an electronic control unit shown in FIG. 3 which relate to neutral control of the automatic transmission shown in FIG. 1A.

In addition, the ECU 90 also executes, according to the flowchart shown in FIG. 4, a neutral control to interrupt the transmission of power by controlling a predetermined clutch C or brake B so that it slips when both the shift lever 72 is in the "D" position, such that the automatic transmission 10 is in the automatic shift mode for forward running, and the accelerator is off. The portion that executes steps S1 to S6 of the signal processing by the ECU 90 corresponds to neutral control executing means, and the portion that executes steps S3 to S6 of those steps corresponds to selecting means.

In step S1 in FIG. 4, it is determined whether the speed of the automatic transmission 10 is fourth speed "4th" or lower and the vehicle speed V is equal to, or less than, a predetermined vehicle speed V1. If the determination is yes, step S2 is executed. The reason for restricting the speed to equal to, or less than, fourth speed "4th" is because in those speeds, slip control can be continued irrespective of a downshift which may occur as the vehicle speed V slows during neutral control while the vehicle is running. More specifically, during a shift between two speeds from first speed "1st" up to and including fourth speed "4th", the first clutch C1 remains applied as a common engaging element while the other engaging elements C2, B1, B2, and B3 are switched between being applied and being released depending on the transmission speed. Therefore, by fundamentally making the first clutch C1 the object of neutral control, slip control can be continued irrespective of a downshift. Further, the predetermined vehicle speed V1 is used to determined whether the vehicle speed is slower than a vehicle speed at which a fuel cut control, which stops the supply of fuel to the engine 40 when the accelerator is off, is executed. The predetermined vehicle speed V1 is therefore set individually for each speed. This is because if a fuel cut is executed there is no need perform the neutral control to reduce the engine load. Therefore, at speeds greater than the predetermined vehicle speed V1 at which the fuel cut control is executed, the neutral control is not executed. It is also possible to determine whether to execute the neutral control according to whether the engine speed $N_E$ is equal to, or less than, a predetermined value or whether the fuel cut control is on or off, or the like.

In step S2, it is determined whether predetermined conditions to execute the neutral control are fulfilled. These conditions are, for example, (a) that the accelerator operation amount $\theta_{TH}$ be substantially 0 or that the idle switch be on while the accelerator is off, (b) the road be substantially flat with a road gradient of substantially 0 degrees, (c) the AT fluid temperature $T_{OIL}$ be within a predetermined range, and (d) the shift lever 72 be in the "D" position such that the automatic transmission 10 is in the automatic shift mode. If all of these conditions are fulfilled, step S3 is executed.

In step S3, it is determined whether the heat load of a first friction apply device, i.e., the first clutch C1 which is fundamentally the object of the neutral control, is equal to, or less than, a predetermined value. If the determination is yes, the neutral control is executed in step S5 such that first clutch C1 is made to slip. If the determination is no, however, step S4 is executed, in which it is determined whether the heat load of a second friction apply device is equal to, or less than, a predetermined value. This second friction apply device is a friction apply device from among a pair of friction apply devices that are frictionally applied in a speed from first speed "1st" to fourth speed "4th" other than the first friction apply device (i.e., other than the first clutch C1). More specifically, in first speed "1st" the second friction apply device is the second brake B2; in second speed "2nd" the second friction apply device is the first brake B1; in third speed "3rd" the second friction apply device is the third brake B3; and in fourth speed "4th" the second friction apply device is the second clutch C2. If the determination in step S4 is yes, i.e., if the heat load of the second friction apply device is equal to, or less than, the predetermined value, the neutral control is executed in step S6 such that the second friction apply device is made to slip. If the determination in step S4 is no, i.e., if the heat load of the second friction apply device is higher than the predetermined value, the neutral control is cancelled. This neutral control places the first clutch C1 or the second friction apply device in a predetermined slipping state or releases it to the point just before it starts to slip to facilitate responsiveness when the neutral control is cancelled by controlling the application torque of the first clutch C1 or the second friction apply device, or more specifically, by controlling the hydraulic pressure with a solenoid valve or the like such that the ratio of the engine speed $N_E$ to the turbine speed $N_T$ becomes a predetermined value (such as approximately 1.0), for example.

Steps S3 and S4 are executed to determine whether it is appropriate to perform slip control on a friction apply device such as the first clutch C1, e.g., whether or not the durability of the friction material or the like would likely to be drastically impaired by the heat load if slip control were to be performed on a friction apply device such as the first clutch C1. This determination can be made, for example, by detecting the temperature in the proximity of the surface of each friction apply device (i.e., the clutches C and brakes B) and determining whether the detected temperature is equal to, or greater than, a predetermined temperature. In this exemplary embodiment, however, the heat load is indirectly determined according to such factors as the slip duration, i.e., the time during which the neutral control (i.e., slip control) is continually performed on the friction apply device, slip rotation speed, input torque, the frequency with which the neutral control is performed, and the history and frequency of application and release (shifting) of the friction apply device on which the slip control is to be performed.

With the neutral control of the automatic transmission 10 according to this exemplary embodiment, the friction apply device, from among each pair of friction apply devices (i.e., the clutches C and brakes B) that are applied to achieve the first speed "1st" to the fourth speed "4th", which is to be placed in a slipping state when the neutral control is executed is selected based on the heat load. As a result, it is possible to continue to execute the neutral control without the durability of the friction apply device being impaired by the heat load, for example, thereby increasing the fuel efficiency effect and the like achieved by the neutral control.

Further, if the heat loads of both of the friction apply devices are high such that the determinations in steps S3 and S4 are both no, the neutral control is cancelled, thus preventing the durability of the friction apply device from being impaired by the heat load generated during the neutral control.

Moreover, according to this exemplary embodiment the neutral control can be executed not only in first "1st" speed, which has the largest gear ratio, but in all speeds up to and including fourth speed "4th", even when the vehicle is running. As a result, it is possible to achieve an even greater fuel efficiency effect and the like by the neutral control than can be achieved when the neutral control is only executed while the vehicle is stopped or in first speed "1st".

In addition, the neutral control is executed in first speed "1st" to fourth speed "4th", throughout which the first clutch C1 is always applied as the common engaging element. Further, the first clutch C1 is fundamentally made the object of the neutral control as the first friction apply device so switching the engaging element that is the object of the neutral control from the first clutch C1 to one of the other engaging elements (e.g., C2, B1, B2, or B3) enables slip control to be continued while downshifting.

Also, the invention according to this exemplary embodiment prevents the neutral control from being executed needlessly, i.e., prevents the execution of neutral control when it does not contribute to greater fuel efficiency, by first determining whether the vehicle speed V is greater than the predetermined vehicle speed V1 at which a fuel cut control, which stops the supply of fuel to the engine 40, is executed and then prohibiting the execution of the neutral control when the vehicle speed V is in the fuel cut region in which the vehicle speed V is greater than the predetermined vehicle speed V1.

Although the invention has been described herein with reference to specific embodiments, many modifications and variations therein will readily occur to those skilled in the art. Accordingly, all such variations and modifications are included within the intended scope of the invention.

What is claimed is:

1. An automatic shifting system for a vehicle, comprising:
   an automatic transmission which is provided with a plurality of engaging elements including a first engaging element and a second engaging element, and which achieves a first running speed by applying the first engaging element and the second engaging element; and
   a controller that executes a neutral control that interrupts the transmission of power by placing at least one of the applied first and second engaging elements in a released or slipping state when the automatic transmission is in a predetermined operating state in the first running speed,
   wherein the controller is adapted to select, when the neutral control is executed, one of the first and second engaging elements based on a predetermined condition and place the selected first or second engaging element in the released or slipping state.

2. The automatic shifting system according to claim 1, wherein the first and second engaging elements are both friction apply devices that apply by friction, and the controller is adapted to also determine a heat load for each of the first and second engaging elements, and reference the determined heat loads as the predetermined condition when selecting the engaging element.

3. The automatic shifting system according to claim 2, wherein the controller is also adapted to prohibit the execution of the neutral control when the determined heat load of the first engaging element exceeds a predetermined first level and the determined heat load of the second engaging element exceeds a predetermined second level.

4. The automatic shifting system according to claim 1, wherein the first running speed is a forward speed; the automatic transmission is adapted to selectively achieve a plurality of forward speeds including the first running speed by selectively applying or releasing the plurality of engaging elements; and the controller is adapted to execute the neutral control even when the automatic transmission is in a second running speed which is a forward speed that has a gear ratio which is higher than the gear ratio of the first running speed.

5. The automatic shifting system according to claim 1, further comprising a vehicle speed sensor that detects the vehicle speed, wherein the controller is adapted to also prohibit the execution of the neutral control when the vehicle speed detected by the vehicle speed sensor exceeds a predetermined value.

6. A method for executing a neutral control in an automatic transmission for a vehicle which is provided with a plurality of engaging elements, comprising:
achieving a first running speed by applying a first engaging element and a second engaging element which are included in the plurality of engaging elements; and
executing the neutral control by selecting one of the first and second engaging elements based on a predetermined condition, placing the selected first or second engaging element in a released or slipping state, and interrupting the transmission of power when the automatic transmission is in a predetermined operating state in the first running speed.

7. The method according to claim 6, wherein the first and second engaging elements are both friction apply devices that apply by friction; a heat load is determined for each of the first and second engaging elements, and the determined heat loads are referenced as the predetermined condition when selecting the engaging element.

8. The method according to claim 7, wherein execution of the neutral control is prohibited when the determined heat load of the first engaging element exceeds a predetermined first level and the determined heat load of the second engaging element exceeds a predetermined second level.

9. The method according to claim 6, wherein the neutral control is executed even in a second running speed which has a gear ratio that is higher than the gear ratio of the first running speed.

10. The method according to claim 6, wherein a vehicle speed is detected and execution of the neutral control is prohibited when the detected vehicle speed exceeds a predetermined value.

* * * * *